United States Patent
Mahalingaiah

[19]

[11] Patent Number: 6,014,741

[45] Date of Patent: Jan. 11, 2000

[54] APPARATUS AND METHOD FOR PREDICTING AN END OF A MICROCODE LOOP

[75] Inventor: Rupaka Mahalingaiah, Austin, Tex.

[73] Assignee: Advanced Micro Devices, Inc., Sunnyvale, Calif.

[21] Appl. No.: 09/233,312

[22] Filed: Jan. 19, 1999

Related U.S. Application Data

[63] Continuation of application No. 08/874,025, Jun. 12, 1997.

[51] Int. Cl.$^7$ ...................................................... G06F 9/34
[52] U.S. Cl. ........................... 712/233; 712/231; 712/234; 712/239; 712/241
[58] Field of Search .................................... 712/239, 241, 712/231, 233, 234

[56] References Cited

U.S. PATENT DOCUMENTS

| | | | |
|---|---|---|---|
| 4,044,338 | 8/1977 | Wolf | 365/49 |
| 4,449,184 | 5/1984 | Pohlman, III et al. | 364/200 |
| 4,453,212 | 6/1984 | Gaither et al. | 711/12 |
| 4,807,115 | 2/1989 | Torng | 712/215 |
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,129,067 | 7/1992 | Johnson | 712/213 |
| 5,136,697 | 8/1992 | Johnson | 712/239 |
| 5,226,126 | 7/1993 | McFarland et al. | 712/218 |
| 5,303,355 | 4/1994 | Gergen et al. | 712/241 |
| 5,404,473 | 4/1995 | Papworth et al. | 712/241 |
| 5,710,902 | 1/1998 | Sheaffer et al. | 712/216 |
| 5,727,194 | 3/1998 | Shridhar et al. | 712/241 |
| 5,740,419 | 4/1998 | Potter | 712/241 |
| 5,748,518 | 5/1998 | Jaggar | 712/221 |
| 5,752,015 | 5/1998 | Henry et al. | 712/241 |
| 5,774,711 | 6/1998 | Henry et al. | 712/244 |
| 5,774,737 | 6/1998 | Nakano | 712/24 |
| 5,784,607 | 7/1998 | Henry et al. | 712/245 |
| 5,867,680 | 2/1999 | Narayan et al. | 712/204 |
| 5,898,865 | 4/1999 | Mahalingaiah | 712/239 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6:The Next Step?," PC Magazine, Sep. 12, 1995, 16 pages.

Tom R. Halfhill, "AMD K6 Takes On Intel P6," BYTE, Jan. 1996, 4 pages.

Primary Examiner—Meng-Ai T. An
Assistant Examiner—Nabil El-Hady
Attorney, Agent, or Firm—Conley, Rose & Tayon, P. C.; Lawrence J. Merkel

[57] ABSTRACT

A superscalar microprocessor implements a microcode instruction unit that predicts the end of microcode loops. The microcode instruction unit detects a microcode loop and begins counting the number of iterations of the loop. The microcode sequence that implements the loop includes a microcode instruction that uses the string count as an operand and/or a result. The microcode instruction unit captures the string count when it is available on either an operand or address bus. The string count is compared to the number of iterations of the string loop to determine when to terminate the microcode loop. If the string count is not captured prior to the microcode instruction unit dispatching more microcode instructions than necessary, the microcode instruction unit notifies other components via a cancel bus. In this manner, the end of a loop is detected prior to the functional unit detecting a mispredicted branch instruction within the microcode loop.

19 Claims, 10 Drawing Sheets

APPARATUS AND METHOD FOR PREDICTING AN END OF A MICROCODE LOOP

This Appln is a continuation of Ser. No. 08/874,025 filed Jun. 12, 1997.

BACKGROUND OF THE INVENTION

1. Field of the Invention

This invention relates to the field of microprocessors and, more particularly, to microcode instruction mechanisms within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decode the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed. Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation.

Often, complex instructions are classified as MROM instructions. MROM instructions are transmitted to a microcode instruction unit, or MROM unit, within the microprocessor, which decodes the complex MROM instruction and dispatches two or more simpler microcode instructions for execution by the microprocessor. The simpler microcode instructions corresponding to the MROM instruction are typically stored in a read-only memory (ROM) within the microcode instruction unit. The microcode instruction unit determines an address within the ROM at which the simpler microcode instructions are stored, and transfers the microcode instructions out of the ROM beginning at that address. Multiple clock cycles may be used to transfer the entire set of microcode instructions corresponding to the MROM instruction. The entire set of microcode instructions that effectuate the function of an MROM instruction is called a microcode sequence. Each MROM instruction may correspond to a particular number of microcode instructions dissimilar from the number of microcode instructions corresponding to other MROM instructions. Additionally, the number of microcode instructions corresponding to a particular MROM instruction may vary according to the addressing mode of the instruction, the operand values, and/or the options included with the instruction. The microcode unit issues the microcode instructions into the instruction processing pipeline of the microprocessor. The microcode instructions are thereafter executed in a similar fashion to other instructions. It is noted that the microcode instructions may be instructions defined within the instruction set, or may be custom instructions defined for the particular microprocessor.

Conversely, less complex instructions are decoded by hardware decode units within the microprocessor, without intervention by the microcode unit. The terms "directly-decoded instruction" and "fastpath instruction" will be used herein to refer to instructions which are decoded and executed by the microprocessor without the aid of a microcode unit. As opposed to microcode instructions which are reduced to simpler instructions which may be handled by the microprocessor, directly-decoded instructions are decoded and executed via hardware decode and functional units included within the microprocessor.

Microcode instructions that implement an MROM instruction may include branch microcode instructions. For example, a string instruction may include a loop of microcode instructions. A microcode loop is one or more microcode instructions that are repetitively executed a specific number of times. The specific number of iterations is called a loop count or string count. A microcode loop may include a branch instruction and a decrement instruction. Each iteration of the loop, the string count is decremented. If the string count is non-zero, the branch instruction branches to the top of the loop and the microcode instructions are dispatched again. Typically, microcode units implement static branch prediction. In other words, the branch prediction is determined during coding and does not change. In the case of a branch instruction of microcode loop, the branch instruction is typically predicted "taken". Therefore, the microcode unit will continually dispatch the loop microcode instructions until a functional unit detects a mispredicted branch. Because of the pipeline nature of the microprocessor, the branch misprediction is not detected by a functional unit for several clock cycles. In the interim between the end of the loop and detecting the branch misprediction, the microcode unit fills the instruction pipeline with microcode instructions that must be flushed. The overhead of issuing and flushing the unnecessary microcode instructions is considerable. The overhead is especially burdensome if the string count is relatively small.

SUMMARY OF THE INVENTION

The problems outlined above are in large part solved by an MROM instruction unit in accordance with the present invention. In one embodiment, the MROM instruction unit includes a counter which counts the number of iterations of a loop of a string instruction. The MROM instruction unit additionally monitors the operands and/or results of the issue positions (the decoders, reservation station and functional units) to detect and capture the string count. When the output of the counter equals the string count, the string instruction has dispatched the specified number of iterations of the loop. When this condition occurs, the MROM instruction unit predicts the loop branch is "not taken", exits the loop and begins executing the next microcode instruction in the microcode sequence. An MROM instruction unit in accordance with the present invention advantageously limits the number of loop iterations to the number specified by the string count. As such, the instruction pipeline is not filled with unnecessary microcode instructions that must be flushed when the end of the string instruction is detected.

Broadly speaking, the present invention contemplates a microcode instruction unit including a counter, a register and a comparator. The counter counts a number of iterations of a microcode loop. The register stores a string count. The comparator is coupled to the register and the counter. The comparator is configured to compare the string count to an output of the counter, and to cause the microcode instruction unit to exit the microcode loop when the output of the counter corresponds to the string count.

The present invention further contemplates a method of predicting an end of a microcode loop comprising the steps of: counting a number of iterations of the microcode loop; capturing a string count; comparing the string count to the counted number of iterations; and exiting the microcode loop if the counted number of iterations corresponds to the string count.

The present invention still further contemplates a microprocessor including an instruction cache, a first instruction unit coupled to the instruction cache, a microcode instruction unit coupled to the instruction cache, a decode unit coupled to the first instruction unit and the microcode instruction unit, and one or more functional units coupled to the decode unit. The microcode instruction unit includes a counter, a register and a comparator. The counter counts a number of iterations of a microcode loop. The register stores a string count. The comparator is coupled to the register and the counter. The comparator is configured to compare the string count to an output of the counter, and to cause the microcode instruction unit to exit the microcode loop when the output of the counter corresponds to the string count.

BRIEF DESCRIPTION OF THE DRAWINGS

Other objects and advantages of the invention will become apparent upon reading the following detailed description and upon reference to the accompanying drawings in which.

Figure 1:
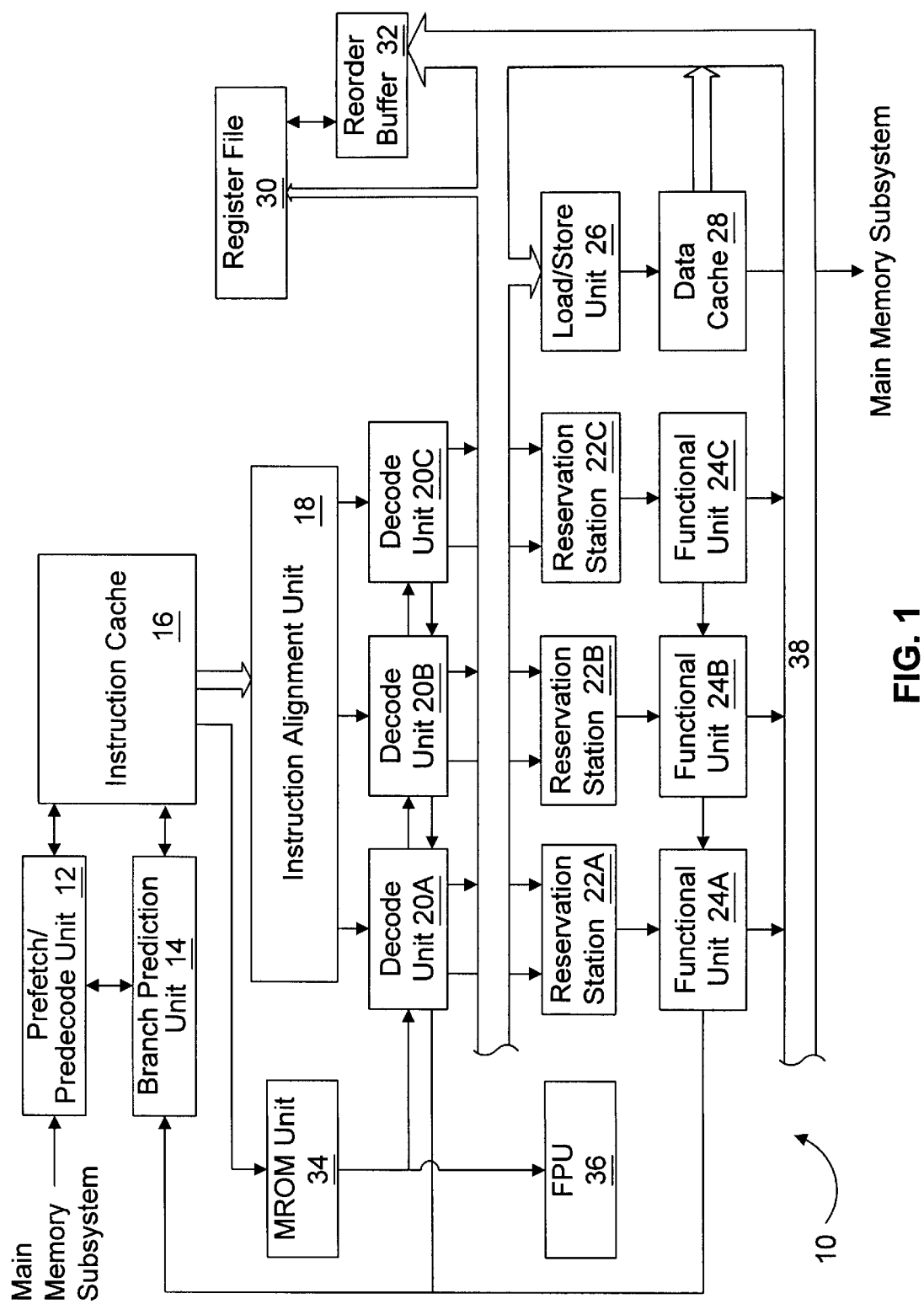
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, MROM unit 34 decodes MROM instructions and dispatches the plurality of microcode instructions that effectuates the operation of the MROM instruction into the instruction processing pipeline. The plurality of microcode instructions that effectuates the operation of an MROM instruction is called a microcode sequence. The microcode sequence may include branch instructions that branch to other microcode instructions. The microcode sequence of some MROM instructions, such as string instructions, contain microcode loops that repetitively execute the same microcode instructions for a specified number of iterations. The microcode loops may include a branch instruction and a decrement instruction. In one embodiment, a string count, which specifies the number of iterations of the loop, is decremented each iteration of the loop. A branch instruction branches to the beginning of the loop if the string count is non-zero. If the string count is zero, indicating that the loop has been dispatched the desired number of times, the branch instruction is "not taken" and microcode instructions subsequent to the loop are dispatched.

Generally speaking, MROM unit 34 predicts the end of a microcode loop of a string instruction by comparing the number of iterations of the microcode loop to the string count of the string instruction. When a microcode loop is encountered, a counter within MROM unit 34 is enabled. The counter is incremented each iteration of the loop. MROM unit 34 captures the string count from either the reorder buffer, the reservation station or the functional unit. The string count is compared to the counter to predict when the loop terminates. When the end of the loop is predicted, the loop is terminated and the microcode instructions subsequent to the loop are dispatched.

Microprocessor 10 is configured to align instructions from instruction cache 16 to decode units 20 using instruction alignment unit 18. Instructions are fetched as an aligned plurality of bytes from a cache line within instruction cache 16. Instructions of interest may be stored beginning at any arbitrary byte within the fetched bytes. For example, a branch instruction may be executed having a target address which lies within a cache line. The instructions of interest therefore begin at the byte identified by the target address of the branch instruction. From the instruction bytes fetched, instruction alignment unit 18 identifies the instructions to be executed. Instruction alignment unit 18 conveys the instructions, in predicted program order, to decode units 20 for decode and execution.

Instruction alignment unit 18 includes a byte queue configured to store instruction bytes. An instruction scanning unit within instruction cache 16 separates the instructions fetched into instruction blocks. Each instruction block comprises a predefined number of instruction bytes. The instruction scanning unit identifies up to a predefined maximum number of instructions within the instruction block. Instruction identification information for each of the identified instructions is conveyed to instruction alignment unit 18 and is stored in the byte queue. The instruction identification information includes an indication of the validity of the instruction, as well as indications of the start and end of the instruction within the predefined number of instruction bytes. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are zero). If more than the maximum number of instructions are contained within a particular predefined number of instruction bytes, the instruction bytes are scanned again during a subsequent clock cycle. The same instruction bytes are conveyed as another instruction block, with the additional instructions within the instruction bytes identified by the accompanying instruction identification information. Therefore, an instruction block may be defined as up to a predefined maximum number of instructions contained within a predefined number of instruction bytes.

The byte queue stores each instruction block and corresponding instruction identification information within a subqueue defined therein. The subqueues include a position for each possible valid instruction within the instruction block. The positions store instruction identification information and are maintained such that the instruction identification information for the first valid instruction within the subqueue is stored in a first position within the subqueue, instruction identification information regarding the second valid instruction (in program order) is stored in a second position within the subqueue, etc. When instructions within the subqueue are dispatched, instruction identification information corresponding to subsequent instructions are shifted within the positions of the subqueue such that the first of the remaining instructions is stored in the first position. Advantageously, instruction alignment unit 18 may only consider the instruction information stored in the first position of each subqueue to detect the instruction to be dispatched to decode unit 20A. Similarly, only the second position of the first subqueue (the subqueue storing instructions prior to the instructions stored in the other subqueues in program order) may be considered for dispatch of instructions to decode unit 20B. By managing the subqueues in this manner, logic for selecting and aligning instruction may be simplified. Fewer cascaded levels of logic may be employed for performing the selection and alignment process, allowing for high frequency implementation of microprocessor 10.

Because instructions are variable length, an instruction may begin within a particular instruction block but end in another instruction block. Instructions beginning within a particular instruction block and ending in another instruction block are referred to as "overflow instructions". The subqueue storing the instruction block within which an overflow instruction begins uses the last position to store the overflow instruction's identification information. Unlike the other positions, the instruction identification information of the last position is not shifted from the last position when an overflow instruction is stored therein. Advantageously, instruction alignment unit 18 need only search the last position of a particular subqueue to identify an instruction overflowing from one subqueue to another.

As used herein, the term queue refers to a storage device for storing a plurality of data items. The data items are stored with an ordered relationship between them. For example, the data items of the byte queue are instructions. The ordered relationship between the instructions is the program order of the instructions. Data items are removed from the queue according to the ordered relationship in a first in-first out (FIFO) fashion. Additionally, the term shifting is used to refer to movement of data items within the queue. When a data item is shifted from a first storage location to a second storage location, the data item is copied from the first storage location to the second storage location and invalidated in the second storage location. The invalidation may occur by shifting yet another data item into the second storage location, or by resetting a valid indication in the second storage location.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. For this embodiment of microprocessor 10, instructions which may be directly decoded by decode units 20 are referred to as "fast path" instructions. Fast path instructions may be an example of directly-decoded instructions for this embodiment. The remaining x86 instructions are referred to as MROM instructions, according to one embodiment. For this embodiment, MROM instructions are an example of microcode instructions.

For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. As used herein, the term "program order" refers to the order of the instruction as coded in the original sequence in memory. The program order of instructions is the order in which the instructions would be executed upon a microprocessor which fetches, decodes, executes, and writes the result of a particular instruction prior to fetching another instruction. Additionally, the term "dispatch" is used to refer to conveyance of an instruction to an issue position which is to execute the instruction. Issue positions may also dispatch load/store memory operations to load/store unit 26.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. As used herein, the term "issue position" refers to logic circuitry configured to receive an instruction and to execute that instruction. Once the instruction enters the issue position, it remains in that issue position until the execution of the instruction is completed.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into an store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
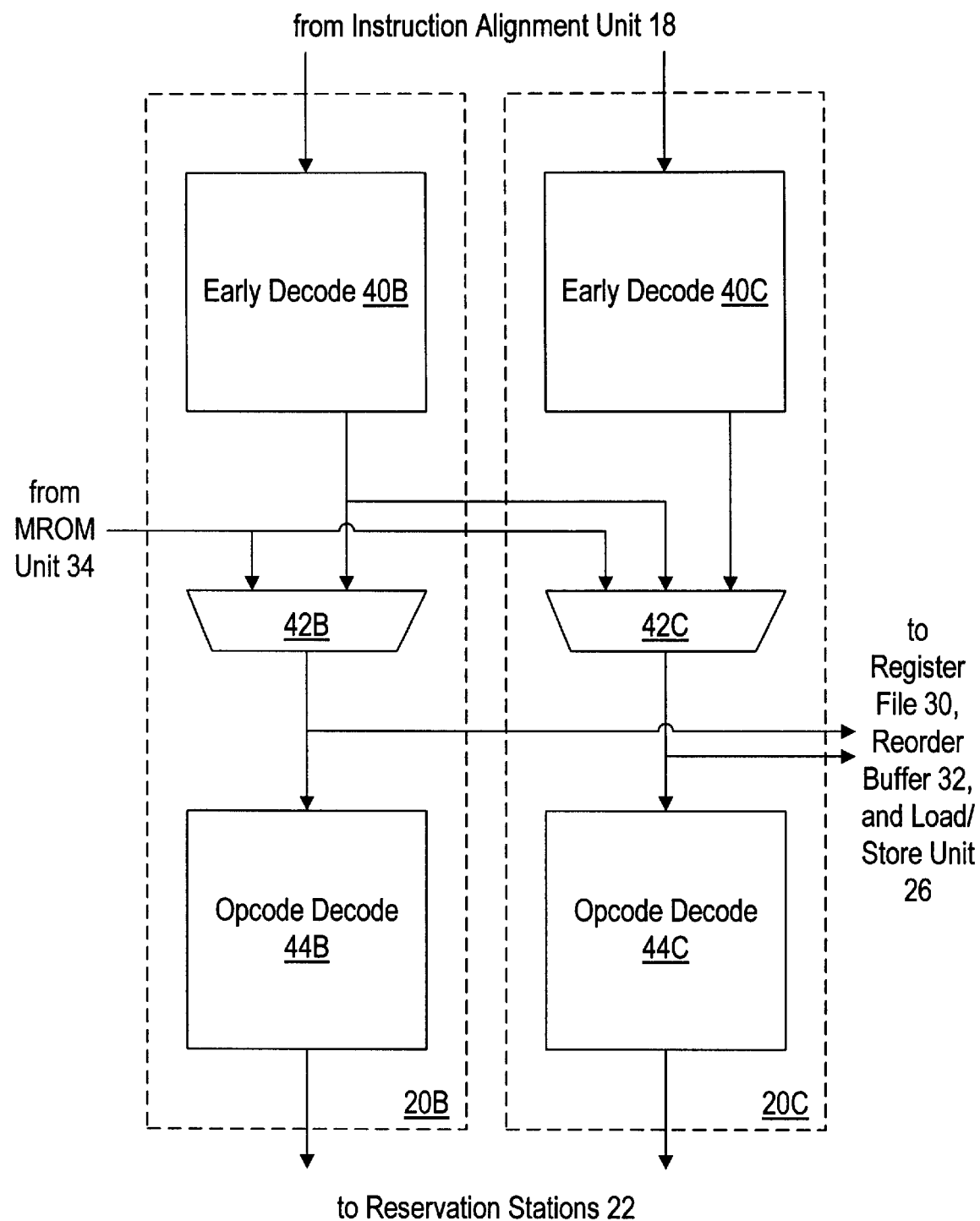
FIG. 2 is a block diagram of one embodiment of two of the decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40B detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit. Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
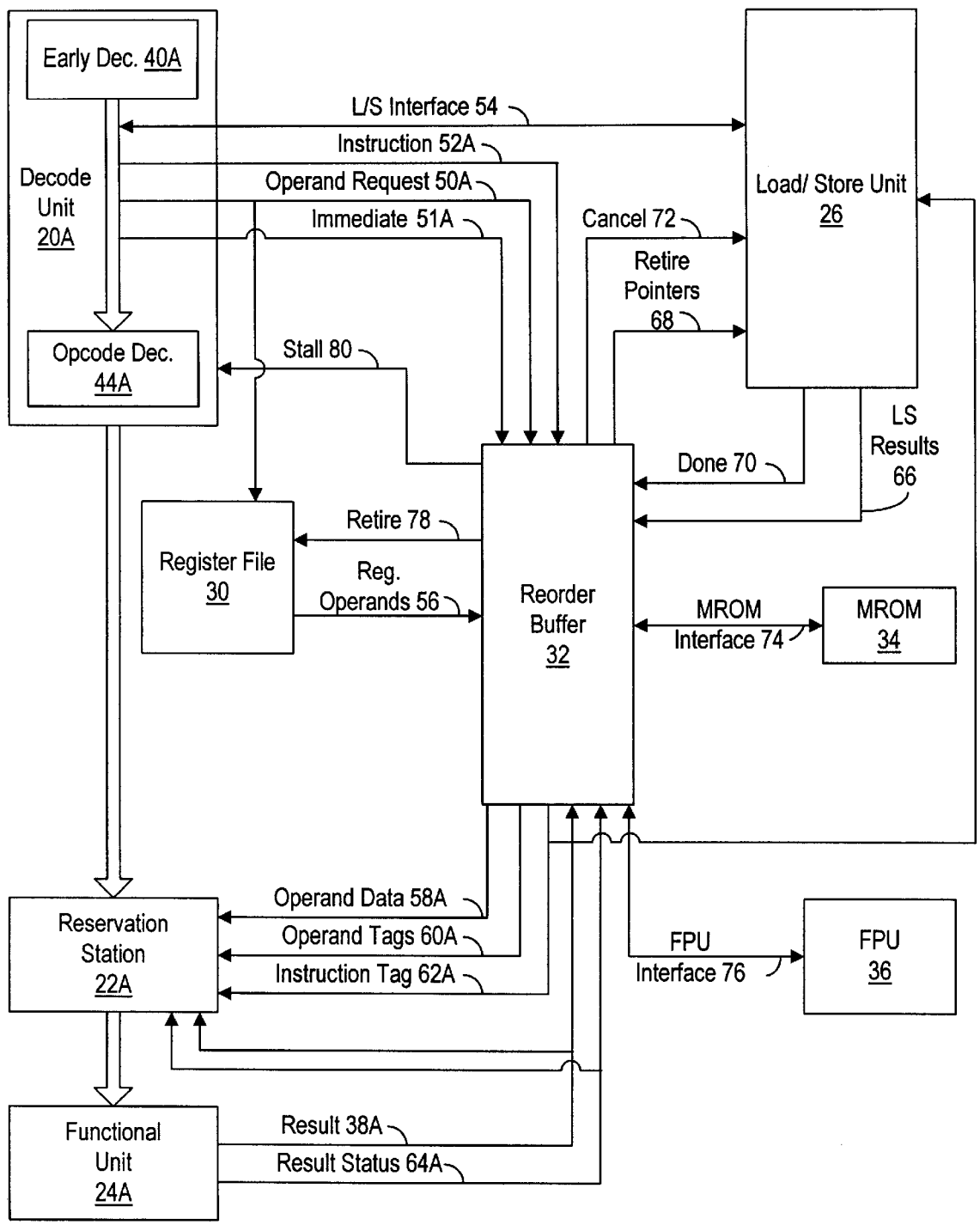
FIG. 3 is a diagram highlighting the interconnection between a decode unit, a load/store unit, an MROM unit, a floating point unit, a functional unit, a reservation station, and a register file shown in FIG. 1, according to one embodiment of the microprocessor.

Turning next to FIG. 3, a block diagram of decode unit 20A, reservation station 22A, functional unit 24A, register file 30, reorder buffer 32, FPU 36, MROM 34, and load/store unit 26 is shown. Interconnection between the units is shown according to one embodiment of microprocessor 10. Other embodiments may employ other interconnection, and additional interconnection may be employed for other purposes. Interconnection between decode units 20B–20C, reservation stations 22B–22C, functional units 24B–24C and the remaining elements of FIG. 3 may be similar.

Decode unit 20A receives an instruction from instruction alignment unit 18. Early decode unit 40A detects the operands used by the instruction and conveys indications of the register operands to reorder buffer 32 and register file 30 upon an operands request bus 50A. Register pointers are conveyed, and the source and/or destination nature of the operand is identified. For the fast path instructions described above, up to two source operands may be identified, one of which is the destination operand as well. Still further, flag operands are identified upon operand request bus 50A. In one embodiment, the flag operands are divided into three groups: the carry flag, the status and direction flags, and the remaining flags. For embodiments employing the x86 microprocessor architecture, the status and direction flags are the D, O, S, Z, P, and A flags. Immediate data is conveyed to reorder buffer 32 upon immediate bus 51A. Reorder buffer 32 relays the immediate data upon operand data bus 58A. Most x86 instructions specify either a second register operand or immediate data, but not both. Therefore, the portion of operand data bus 58A used to convey the second register operand value may be used to convey the immediate data. For branch instructions, the program counter address, an offset, and the predicted target address may be conveyed upon operand data bus 58A.

Decode unit 20A additionally conveys certain information regarding the instruction to reorder buffer 32 upon an instruction bus 52A. Exemplary instruction information employed in one embodiment of microprocessor 10 is described in more detail further below. Additionally, early decode unit 40A detects load/store memory operations specified by the instruction. An indication of the memory operations is conveyed to load/store unit 26 via load/store interface 54.

In response to the operands conveyed upon operands request bus 50A, register file 30 conveys register operand values upon register operands bus 56 to reorder buffer 32. The register values conveyed comprise the values stored in register file 30 (i.e. the values generated according to the instructions previously retired by reorder buffer 32). If reorder buffer 32 is not storing information regarding an instruction which uses the register as a destination operand, the value provided by register file 30 is conveyed to the reservation station 22A–22C which receives the instruction. For example, a register value corresponding to the instruction conveyed to reservation station 22A may be conveyed upon operand data bus 58A.

Alternatively, reorder buffer 32 may be storing information regarding an instruction which updates the requested register. If the instruction has executed and has provided an instruction result, that result is conveyed in lieu of the register value provided by register file 30 upon operand data bus 58A. If the instruction has not yet executed, the reorder buffer tag locating the instruction within reorder buffer 32 is conveyed upon an operand tags bus 60A. One operand data value and one operand tag are provided for each source operand of the instruction upon operand data bus 58A and operand tags bus 60A, respectively. Additionally, validity indicators are asserted for each data and tag value by reorder buffer 32, such that reservation station 22A may discern which is being provided for a particular operand (e.g. data or reorder buffer tag).

In addition to providing operand values and tags, reorder buffer 32 provides an instruction tag for the instruction being dispatched to reservation station 22A upon an instruction tag bus 62A. The instruction tag identifies the instruction storage position within reorder buffer 32 which stores information regarding the instruction. The instruction tag is conveyed upon result status bus 64A when the instruction is executed, such that the corresponding instruction result may be stored within reorder buffer 32. In a line-oriented reorder buffer embodiment, instruction tag bus 62A conveys a line tag identifying the line of storage which stores the instruction information. The offset tag is a constant which is inherent in the issue position to which the instruction is conveyed. In other words, functional unit 24A provides results which are always stored at a particular offset within the lines of storage within reorder buffer 32.

In addition to storing the operand values and tags corresponding to an instruction, reservation station 22A receives the decoded instruction provided by opcode decode unit 44A. When each of the source operand values corresponding to the instruction have been provided by reorder buffer 32 or have been captured from result buses 38, the instruction may be selected for execution by functional unit 24A. Upon selecting the instruction for execution, reservation station 22A conveys the decoded instruction and corresponding operands to functional unit 24A.

Functional unit 24A executes instructions received from reservation station 22A and conveys the result generated and the instruction tag on result bus 38A. It is noted that result bus 38A is coupled to reservation stations 22 (such as reservation station 22A shown in FIG. 3) for providing forwarded results thereto. Still further, result bus 38A is coupled to load/store unit 26. It is further noted that the execution tag and the instruction result may be forwarded on separate buses. Functional unit 24A provides the logical address of a memory operation specified by the instruction being executed therein to load/store unit 26 via result bus 38A or execution tag bus 65A.

Functional unit 24A additionally forwards a result status upon a result status bus 64A to reorder buffer 32. The result status indicates any exceptions associated with the instruction, such that reorder buffer 32 may take appropriate corrective actions. Result status bus 64A additionally is used to indicate execution of a branch instruction which is mispredicted. Corrective actions may include hardware supported correction, trapping to a microcode routine within MROM unit 34, or trapping to a software routine stored at a particular address identified for the instruction. Corrective action for a mispredicted branch instruction typically includes canceling instructions later in the program execution sequence, and restoring the state of the microprocessor to the state prior to the mispredicted branch.

Reorder buffer 32 interfaces to load/store unit 26 to allow completion of load/store memory operations. Load/store unit 26 may be configured to speculatively execute load and store memory operations which hit in data cache 28. Load memory operation results (along with a reorder buffer tag including both line tag and offset tag portions) are conveyed upon an LS results bus 66 to reorder buffer 32. Additionally, the load results are forwarded to reservation stations 22 in order to provide operands thereto. In one embodiment, up to two results may be provided upon LS results bus 66.

Load/store unit 26 may be configured not to speculatively perform memory operations which miss data cache 28. Reorder buffer 32 indicates upon retire pointers bus 68 which memory operations are otherwise in position to be retired but have not yet executed. Load/store unit 26 then performs the indicated memory operations and returns results upon LS results bus 66. Additionally, load/store unit 26 asserts a corresponding signal upon a done bus 70. Reorder buffer 32 recognizes the asserted done signal as a completion of the memory operation indicated upon retire pointers bus 68. Since load/store unit 26 may execute up to two memory operations concurrently according to one embodiment, retire pointers bus 68 may carry up to two reorder buffer tags. Accordingly, done bus 70 includes two done signals corresponding to each of the reorder buffer tags.

A cancel bus 72 is included between reorder buffer 32 and load/store unit 26 as well. Cancel bus 72 includes a signal for each reorder buffer tag conveyed upon retire pointers bus 68. If the corresponding cancel signal is asserted, then reorder buffer 32 is indicating that the corresponding memory operation should be deleted from load/store unit 26. Memory operations are deleted when they are subsequent to a mispredicted branch or an instruction which experienced an exception, for example.

Reorder buffer 32 interfaces with MROM unit 34 and FPU 36 via MROM interface 74 and FPU interface 76, respectively. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 32 informs MROM unit 34 via MROM interface 74. MROM unit 34 performs branch misprediction recovery for such mispredicted branch instructions.

Since FPU 36 operates as a coprocessor, several signals are used to synchronize completion of an instruction within FPU 36. These signals are included within FPU interface 76. Generally, a signal may be asserted to FPU 36 indicating that a particular floating point instruction may be retired. When the floating point instruction is retired, FPU 36 asserts a second signal. Additionally, upon detection of a floating point synchronization instruction, another set of signals are asserted to synchronize the completion of the instruction.

Instructions are retired from reorder buffer 32 in program order, i.e., in the original program execution sequence. Upon retirement, the corresponding register results are conveyed upon a retire bus 78 to register file 30. In a line-oriented reorder buffer embodiment, multiple instructions are allocated to a line of storage and the instructions within a line of storage are retired simultaneously. Since more than one instruction within the instructions may update the same register, reorder buffer 32 employs a set of bits within each line referred to as the last in line (LIL) bits. The LIL bits are set for each instruction which is the last instruction within the line to update a particular register. One bit is included for each portion of the register (i.e. EAX, AH, and AL, wherein AX is represented by both AH and AL being set). Effectively, these bits act as byte enables for updating the register. Therefore, an instruction which updates AH and another instruction which updates AL may retire simultaneously. For embodiments employing a microprocessor architecture which does not allow updates to only a portion of a register, one LIL bit is included for each instruction.

Finally, reorder buffer 32 employs a stall line 80 for stalling instruction dispatch. Instruction dispatch may be stalled for many reasons, including: reorder buffer, reservation station, or load/store buffer fill conditions; a narrow to wide stall; instruction serialization; etc. Upon detection of a stall condition, reorder buffer 32 asserts a stall signal upon stall line 80. If decode unit 20A receives an asserted stall signal during a clock cycle and decode unit 20A is attempting to dispatch an instruction, decode unit 20A provides that same instruction during a subsequent clock cycle. In this manner, an instruction which cannot be dispatched during a particular clock cycle is continuously redispatched until the stalling condition terminates.

Figure 4:
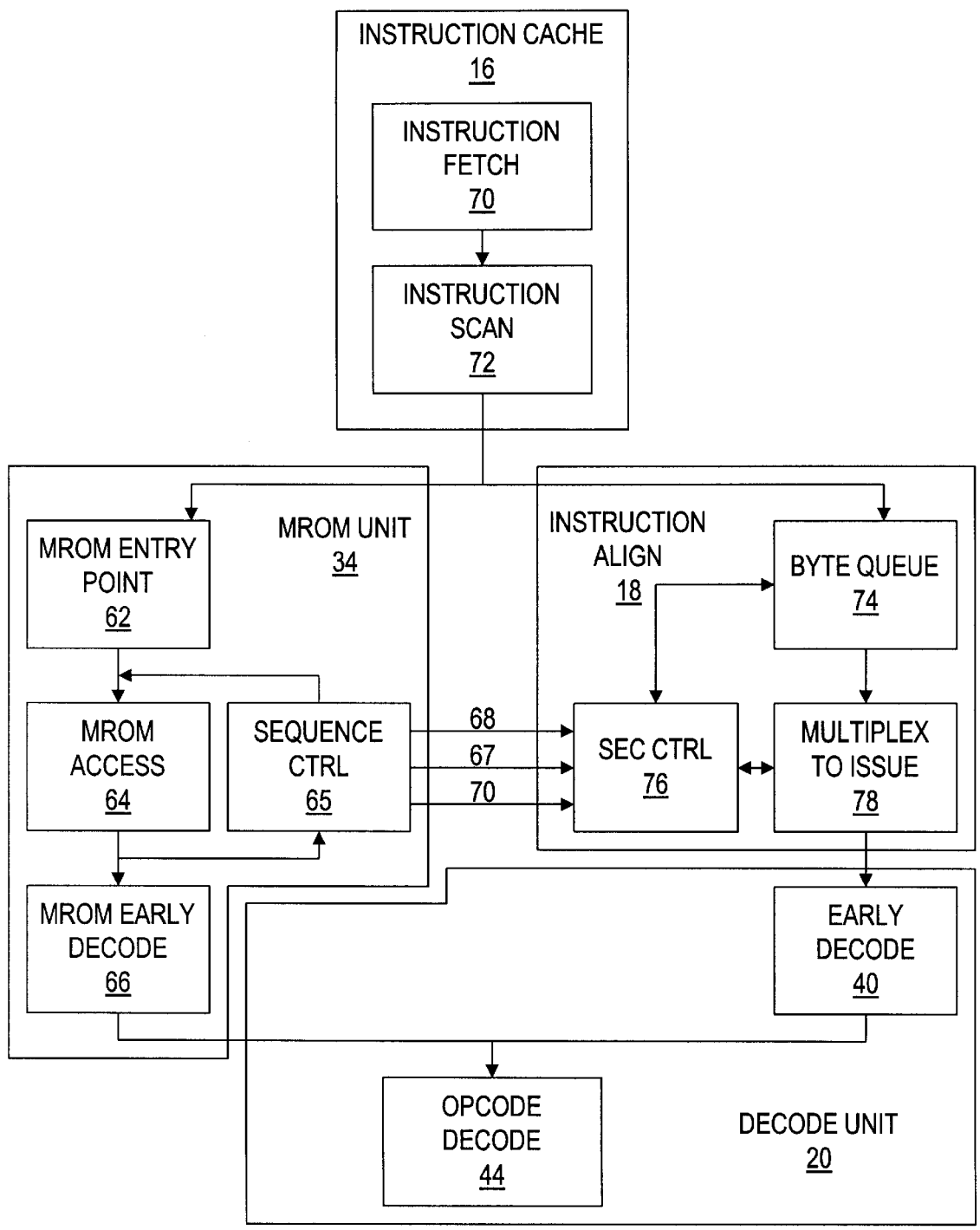
FIG. 4 is a block diagram depicting a portion of an instruction processing pipeline employed by one embodiment of the microprocessor shown in FIG. 1.

Turning now to FIG. 4, a block diagram depicting portions of instruction cache 16, instruction alignment unit 18, decode unit 20 and MROM unit 34 is shown. Embodiments of microprocessor 10 may employ other elements in addition to those shown in FIG. 4. Instruction cache 16 includes instruction fetch 70 and instruction scan 72. MROM unit 34 includes MROM entry point 62, MROM access 64, sequence control 65, and MROM early decode 66. Instruction alignment unit 18 includes byte queue 74, selection control unit 76, and multiplex to issue 78. Decode unit 20 includes early decode 40 and opcode decode 44.

Instruction fetch 70 fetches instructions from instruction cache storage (not shown) using addresses provided by branch prediction unit 14. Instruction fetch 70 conveys the fetched instructions to instruction scan unit 72. Instruction scan unit 72 conveys the instructions to byte queue 74 and detects MROM instructions. MROM instructions detected by instruction scan unit 72 are conveyed to MROM entry point 62. In one embodiment, one MROM instruction per clock cycle is accepted by MROM unit 34. Therefore, if a second MROM instruction is detected within a set of instruction bytes being scanned during a particular clock cycle, instruction blocks including the second MROM instruction and subsequent instructions in the program order are stalled until a subsequent clock cycle.

The flow of instructions through instruction alignment unit 18 and decode unit 20 is discussed in more detail below with reference to FIG. 8. The flow of instructions through MROM unit 34 is discussed next. MROM entry point 62 calculates the location, or microaddress, of the first microcode instruction in MROM access 64 that corresponds to an MROM instruction received from instruction scan unit 72. In one embodiment, the microaddress is calculated from the opcode, the ModR/M bytes, and the prefix byte of the MROM instruction. The microaddress calculated by MROM entry point 62 is the location of the first microcode line that stores the microcode instructions that effectuate the desired operation of the MROM instruction. Microcode instructions, like fastpath instructions, are directly decodeable by the decode unit. The number of microcode instructions required to implement an MROM instruction varies from MROM instruction to MROM instruction. Complex MROM instructions may require many microcode instructions, and relatively simple MROM instructions may be implemented by two microcode instructions. The microcode instructions that implement an MROM instruction may include branch instructions. For example, in one embodiment the microcode instructions to implement the MROM instruction MOVS are:

instruction, sequence control unit 65 detects the branch microaddress and provides that microaddress as the next line to access from MROM access 64. MROM access 64 may contain two types of branch instructions: conditional sequence control branches and predict branches. A conditional sequence control branch is a branch instruction in which the branch condition can be resolved during decode. Predict branches are branches that cannot be resolved until the branch instruction is executed by a functional unit. Predict branches may depend on the state on the EFLAGs register. Because dispatched instructions that have not completed execution may modify the contents of this register, the branch condition cannot be resolved during decode. Therefore, a prediction is made whether the branch is "taken" or "not taken". This prediction is referred to as a "branch prediction indication." If the branch is predicted "taken", sequence control 65 generates the microaddress of the next microcode line to access. If the branch is predicted "not taken", sequence control 65 provides the microaddress of the next microcode line as the next microcode line to access. In one embodiment, MROM unit 34 uses static branch prediction. In other words, the prediction is made

```
          LDDF                    ;load direction flag to latch in FU
          OR       ECX,ECX        ;test if ECX is zero
          JZ       end_loop       ;terminate string moves if ECX is zero
loop:     MOVFM+   tmp0, [ESI]    ;move to tmp0 data from source and inc/dec
                                   esi
          MOVTM+   [EDI], tmp0    ;move the data to destination and inc/dec edi
          DECXJNZ  loop           ;dec ECX and repeat until zero
end_loop: EXIT
```

MOVS is an example of a string instruction. The loop of the string instruction is repeated a number of times specified by a value stored in register ECX. The microcode sequence first loads the direction flag. The microcode sequence then tests the string count for zero by ORing the ECX register with itself and jumping on zero to the end of the loop. If the ECX register is non-zero, the loop of the string instruction is begun. After each iteration of the loop, the value in ECX is decremented. If the value of ECX, after being decremented, is non-zero, the microcode sequence branches to the beginning of the loop and repeats the microcode loop instructions. After the loop has been implemented the number of times specified by the ECX register, the loop is terminated and the exit microcode instruction is implemented.

MROM access 64 is a storage device capable of storing microcode instructions. In one embodiment, MROM access 64 is a read-only memory (ROM). In other embodiments, other storage devices can be used to implement MROM access 64. MROM access 64 uses the entry point microaddress generated by MROM entry point 62 to access the first microcode instruction line of a microcode sequence. In one embodiment, MROM access 64 stores multiple microcode instructions in each microcode line of MROM access 64. In one specific embodiment, each microcode line contains a number of microcode instructions equal to the number of functional units in the microprocessor. Because the number of microcode instructions required to implement an MROM instruction may exceed the number of microcode instructions in one line of MROM access 64, sequence control 65 determines the location of the next line of microcode to be accessed. The next line of microcode to accessed may be the subsequent line in MROM access 64. If, however, a microcode line in MROM access 64 includes a "taken" branch during coding of the microcode and does not change. Other embodiments may use more complex branch prediction algorithms.

In addition to specifying branch addresses, sequence control 65 also detects the last line of the microcode sequence. If a line of microcode in MROM access 64 is the last line of microcode to implement an MROM instruction, sequence control 65 selects the entry point of the next MROM instruction, provided by MROM entry point 62, as the microaddress of the next line of microcode.

Each line of microcode accessed from MROM access 64 is dispatched to MROM early decode 66. MROM early decode 66 formats the instructions similar to the formatting of early decode unit 40, as discussed above with reference to FIG. 2. The formatted instructions are conveyed to opcode decode 44, which selects either the microcode instructions conveyed by MROM early decode 66 or fastpath instructions conveyed by early decode 40.

Fastpath instructions from instruction alignment unit 18 are stalled while MROM microcode instructions that implement an MROM instruction are issued by MROM unit 34. It is noted that a particular MROM instruction may arrive at MROM access 64 prior to being selected for dispatch from byte queue 74. The particular MROM instruction may be subsequent to a large number of fast path instructions within the byte queue and instructions are selected for dispatch in program order. MROM instructions are routed to MROM unit 34 but are not removed from the instruction blocks conveyed to instruction alignment unit 18. For these reasons, synchronization is provided between MROM access 64 and multiplex to issue 78. When MROM access 64 receives an entry point address from MROM entry point 62, MROM access 64 informs multiplex to issue 78 by asserting a signal upon synchronization bus 67. When multiplex to issue 78 receives a dispatched MROM instruction from byte queue 74, multiplex to issue 78 signals MROM access 64 via synchronization bus 67. In this manner, the MROM instruction progresses to both MROM early decode 66 and early decode 40 during the same clock cycle. Because both MROM access 64 and multiplex to issue 78 receive instructions in program order it is sufficient to synchronize instructions via synchronization bus 67.

As discussed above, sequence control 65 determines the microaddress of the next microcode line to access from MROM access 64. To generate the next address, each microcode line has a microcode sequence control field, or simply "sequence control field", associated with it. Generally speaking, a sequence control field is a field that contains data used to control the access of data within an MROM storage device. In one embodiment, this field contains data indicating whether the line is the last line of the microcode instruction, whether the microcode line contains a jump, call or branch, conditions for conditional microbranches, and other information necessary for sequence control of MROM access 64. In one embodiment, the sequence control field for a microcode line is appended to the previous microcode line. In this manner, the sequence control field is known one cycle in advance. Therefore, the generation of the next address is done in parallel with accessing the microcode line from MROM access 64.

Sequence control 65 also detects the last microcode line in a microcode sequence that implements an MROM instruction and how many microcode instructions are in the last microcode line. The number of microcode instructions in the last microcode line is conveyed to selection control 76 via an early exit signal line 68. Selection control 76 uses the information from the early exit signal to pack additional fastpath instructions at the end of the microcode instruction line. In this manner, instructions are issued to each functional unit and dispatch bandwidth is not wasted.

Figure 5A:
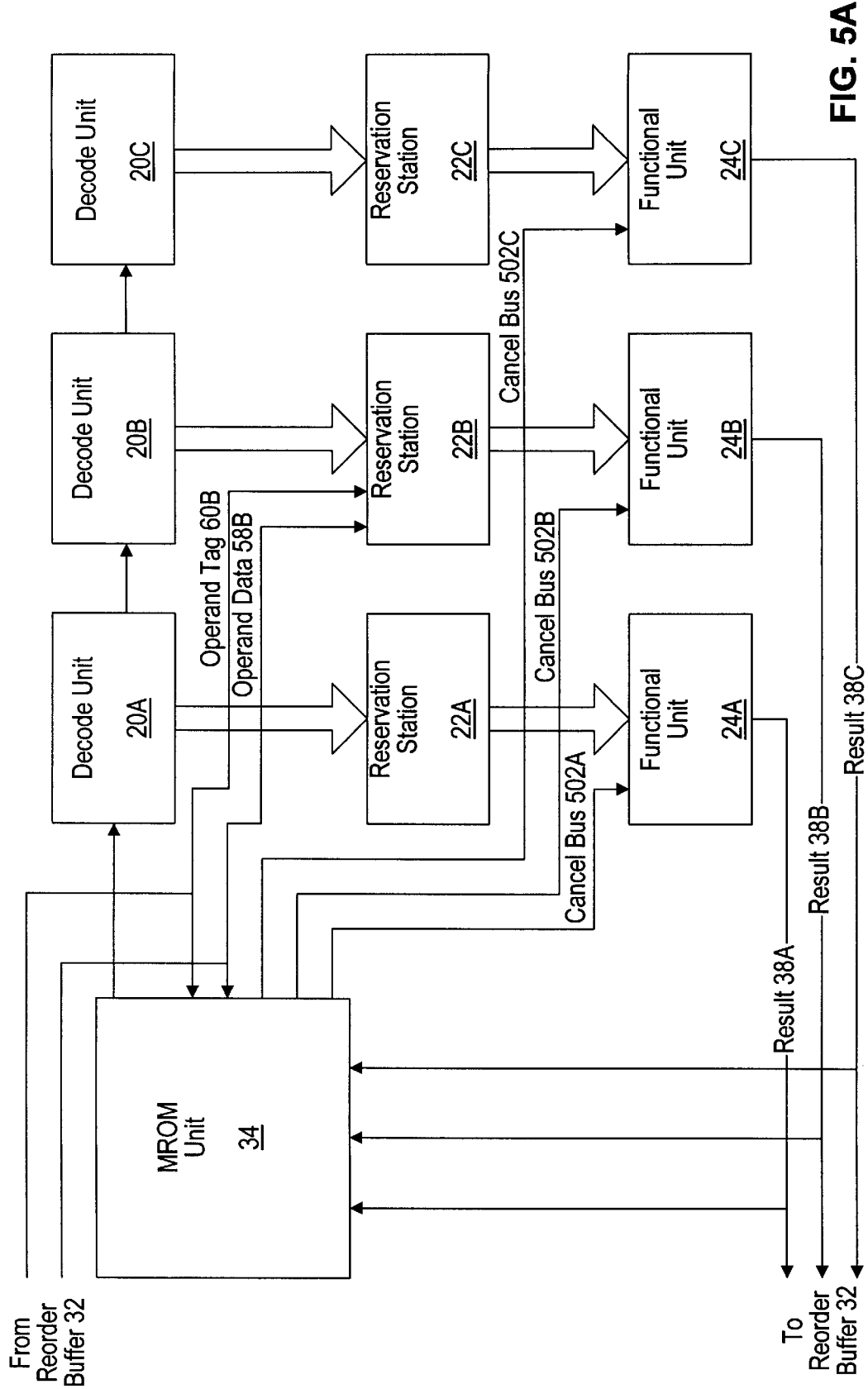
FIG. 5A is a block diagram illustrating one embodiment of the interconnection between an MROM unit, a plurality of decoders, a plurality of reservation stations, and a plurality of functional units.

Turning now to FIG. 5A, a block diagram illustrating one embodiment of the interconnection of MROM unit 34, decode units 20, reservation stations 22, and functional units 24 is shown. MROM unit 34 is coupled to decode units 20 and functional units 24. Decode units 20 are coupled to MROM unit 34 and reservation stations 22. Reservation stations 22 are coupled to functional units 24. Reorder buffer 32 is coupled to decode units 20B and functional units 24, and MROM unit 34.

MROM unit 34 predicts the end of a loop of a string instruction by comparing the number of iterations of the loop to the string count. In one embodiment, the string count is stored in register ECX. In one embodiment, MROM unit 34 monitors operand data bus 58B, operand tags bus 60B, and result bus 38 to detect and capture the string count stored in register ECX. In one embodiment, one of the first microcode instructions of a microcode sequence tests the value stored in the ECX register to determine if the ECX register value is zero. In one particular embodiment, this test is accomplished by ORing the ECX register with itself. When the OR instruction is dispatched to a reservation station, reorder buffer 32 outputs either the value stored in the ECX register on operand data bus 58B, or an operand tag for the ECX register on operand tag bus 60B (see discussion related to FIG. 3). If the value of the ECX register is available on operand data bus 58B, MROM unit 34 captures the data and stores it in an internal register to compare with the number of iterations of the loop instruction. If, however, the register value is not immediately available, then MROM unit 34 captures the operand tag from operand tag bus 60B.

If MROM unit 34 captured the operand tag from operand tag bus 60B, then MROM unit 34 monitors result bus 38 to obtain the register value. As discussed above with reference to FIG. 3, when a result of a functional unit updates the value of a register, the result and the operand tag for that result are conveyed on result bus 38. MROM unit 34 monitors and captures the result associated with the operand tag captured as the OR instruction was issued to the reservation station.

In one particular embodiment, the OR instruction of the microcode sequence is the second microcode instruction of the microcode sequence, and MROM unit 34 always issues the first microcode instruction to issue position A. Therefore, the second microcode instruction, the OR instruction, is always dispatched to issue position B. As such, the MROM unit only monitors operand data bus 58B and operand tag bus 60B. If the register value is available of the operand bus, it will be on operand data bus 58B. If the register value is not available the operand tag will be on operand tag bus 60B. In this embodiment, however, it is necessary to monitor result buses 38A–38C. Because any dispatch position may update the contents of register ECX, the register value may be output on any result bus.

MROM unit 34 captures the operand or operand tag of the OR instruction as it is issued to reservation station 22B from reorder buffer 32. MROM unit 34 determines the correct operand to capture based on the number of non-stalled clock cycles subsequent to dispatching the OR instruction. Because instructions are dispatched to reservation station 22 in program order and a fixed number of non-stalled cycles before the OR instruction is issued to reservation station 22 is fixed.

In other embodiments, MROM unit 34 may capture the string count in other ways. Instructions other than an OR instruction can use the string count as an operand. For example, a move instruction would cause the register value to be output on the operand and/or the result bus. In one specific embodiment, a microcode instruction could be defined that directly moves the string count to a register file in the MROM unit. In this embodiment, the register value does not have to be captured from the operand or result bus. The data is directly moved to the MROM register.

MROM unit 34 may be unable to correctly predict the end of a loop. For example, if the string count is relatively small, the number of iterations of the loop dispatched by the MROM unit 34 may exceed the string count prior to the MROM unit obtaining the value of the ECX register. As discussed above, it takes several clock cycles before the ECX value is available on either operand data bus 58 or result bus 38. If the string count is relatively small, MROM unit 34 may have already dispatched more iterations of the string instruction loop then required. MROM unit 34 will detect this condition when it receives the string count. When an MROM unit 34 detects this condition, functional units 24 are notified via cancel bus 502. In one embodiment, functional units 24 treat the dispatching of more microcode instructions than required as a mispredicted branch condition. In one embodiment, cancel bus 24 may be coupled to other portions of microprocessor 10. Generally speaking, cancel bus 502 carries a signal that indicates unnecessary microcode instructions have been dispatched into the instruction processing stream. This signal can be routed to any portion of microprocessor 10.

In the above described embodiment, MROM unit 34 is able to obtain the value stored in register ECX when it is first available. If the value stored in register ECX is available from reorder buffer 32, MROM unit 34 captures the value from operand data bus 58 as it is conveyed to reservation station 22. If the value is not available from reorder buffer 32, MROM unit 34 captures the value on result bus 38 as functional unit 24 conveys the value to reorder buffer 32.

Figure 5B:
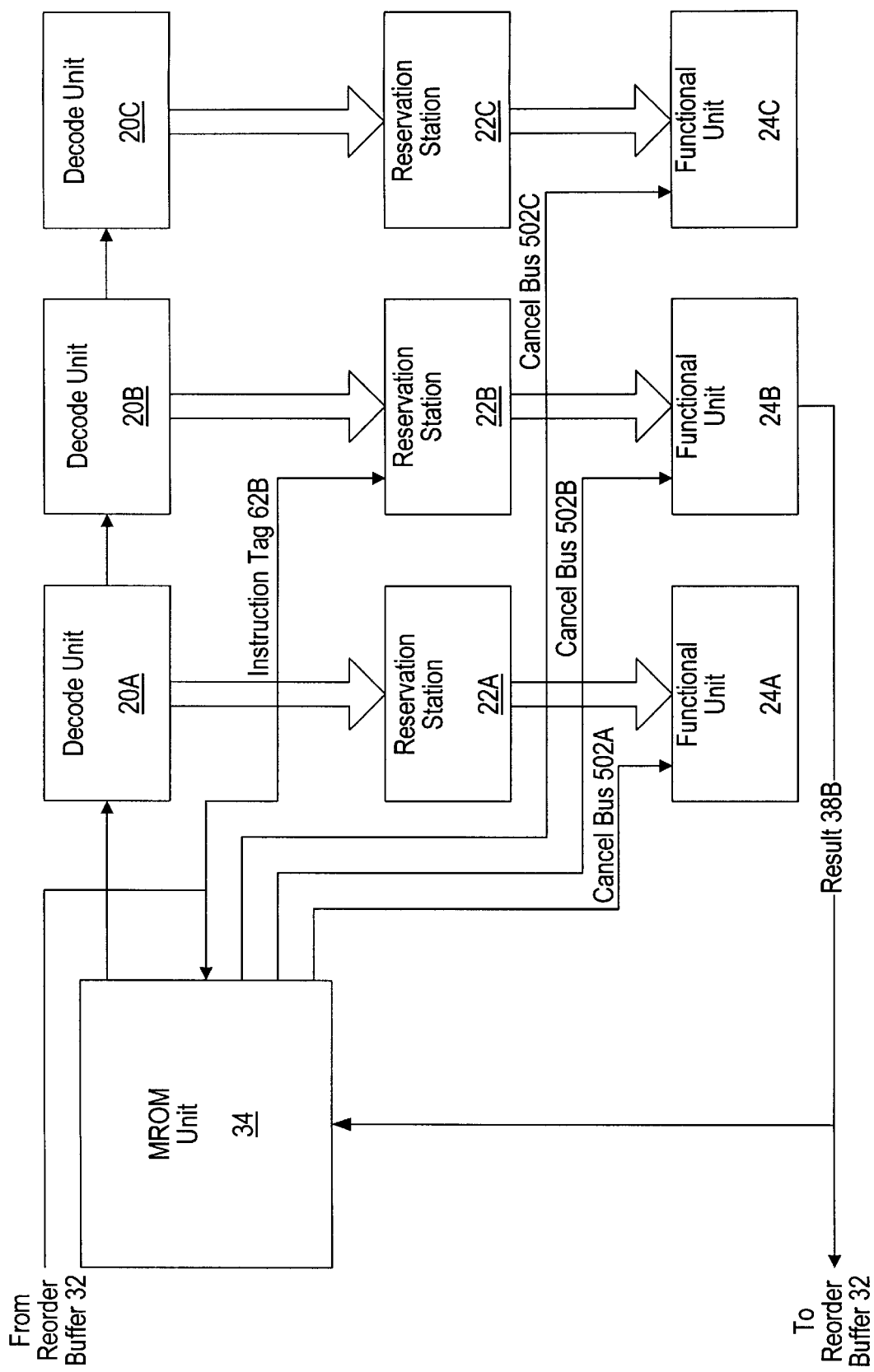
FIG. 5B is a block diagram illustrating another embodiment of the interconnection between an MROM unit, a plurality of decoders, a plurality of reservation stations, and a plurality of functional units.

Referring now to FIG. 5B, an alternative embodiment of the interconnection between MROM unit 34, decode units 20, reservation stations 22, and functional units 24 is shown. MROM unit 34 is coupled to decode units 20 and functional units 24. Decode units 20 is coupled to reservation stations 22 and MROM unit 34. Functional units 24 are coupled to reservation stations 22 and reorder buffer 32. Reorder buffer 32 is coupled to MROM unit 34, decode units 20, and functional units 24, and MROM unit 34. MROM unit 34 predicts the end of a string instruction loop by comparing the number of iterations of the loop to a string count. In one embodiment, the string count is stored in a register ECX. In one embodiment, MROM unit 34 captures the value of register ECX from result bus 38B. In one particular embodiment, the second microcode instruction of the MROM string instruction tests the value stored in register ECX to determine if it is non-zero. The value of the string count is captured as the result of the instruction is output on the result bus. In one particular embodiment, the value of ECX is tested by executing an OR instruction that OR's the ECX register with itself and branches if the zero bit is set. Because the OR instruction is the second microcode instruction of the microcode sequence, the OR instruction will always be issued to issue position B. Therefore, MROM unit 34 only needs to monitor result bus 38B to capture the value stored in register ECX.

MROM unit 34 captures the instruction tag of the OR instruction as it is issued to reservation station 22B from reorder buffer 32. MROM unit 34 determines the correct instruction tag to capture based on the number of non-stalled clock cycles subsequent to dispatching the OR instruction. Because instructions are dispatched to reservation station 22 in program order and a fixed number of pipeline stages exist between MROM unit 34 and reservation station 22, the number of non-stalled cycles before the OR instruction is issued to reservation station 22 is fixed. By capturing the instruction tag from instruction tag bus 62B, MROM unit 34 is able to capture the result of the OR instruction as it is conveyed from functional unit 24B to reorder buffer 32.

As discussed above in reference to FIG. 5A, MROM unit 34 may not correctly predict the end of a loop. If MROM unit 34 fails to correctly predict the end of a loop, the misprediction is conveyed to functional unit 24 via cancel bus 502.

The embodiment illustrated in FIG. 5B captures the value stored in register ECX after functional unit 24 has executed the OR instruction. In contrast, the embodiment illustrated in FIG. 5A captures the data value stored in register ECX as the operand of the OR instruction is provided to reservation station 22B. Therefore, the embodiment illustrated in FIG. 5A obtains the value stored in register ECX before the embodiment illustrated in FIG. 5B. The embodiment illustrated in FIG. 5A may receive the register value a few clock cycles or many clock cycles before the embodiment illustrated in FIG. 5A depending upon the order instructions are dispatched from reservation station 22 and the number of clock cycles required to execute the instructions issued prior to the OR instruction. An advantage of the embodiment illustrated in FIG. 5B is that MROM unit 34 only needs to monitor one of the three result buses (Result bus 38B).

Figure 6:
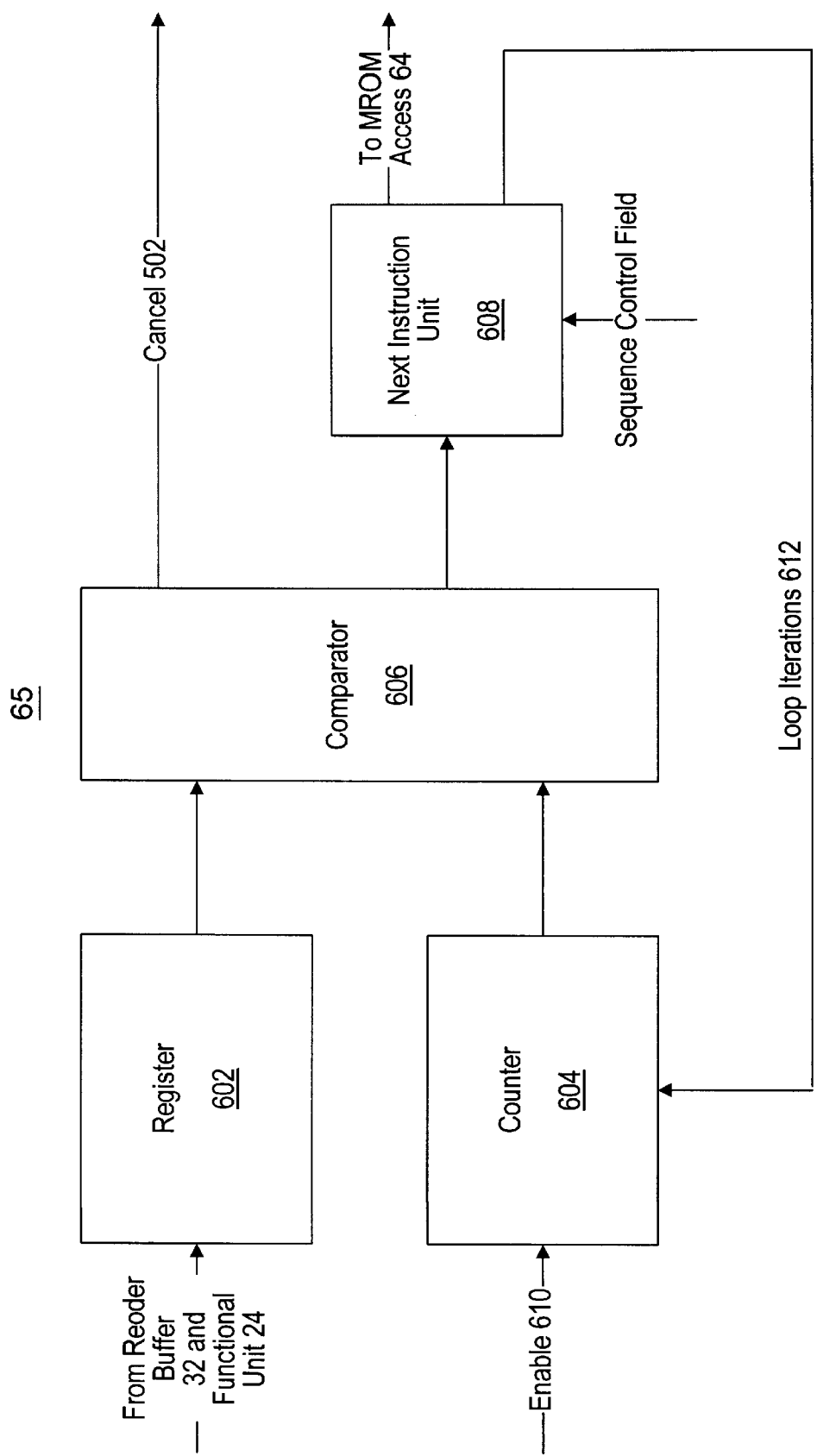
FIG. 6 is a block diagram of one embodiment of a sequence control unit of an MROM unit.

Referring now to FIG. 6, one embodiment of sequence control 65 is shown. Sequence control 65 includes a register 602 coupled to a comparator 606, a counter 604 coupled to comparator 606, and a next instruction unit 608 coupled to comparator 606 and counter 604.

In one embodiment, when MROM unit 34 dispatches a string instruction, it enables counter 604 via enable signal line 610. Counter 604 counts the number of iterations of a loop. In one embodiment, next instruction unit 608 determines the number of iterations of the loop based on a sequence control field and provides a signal to counter 604 via loop iteration signal line 612. In another embodiment, the number of iterations can be based on a clock that counts the number of microcode instructions issued.

Register 602 captures and stores the string count. As used herein the term register indicates any storage or memory device. In one embodiment, the string count is stored in a register within register file 30. In one particular embodiment, the string count is stored in register ECX. As discussed above with reference to FIGS. 5A and 5B, register 602 may capture the data stored in register ECX from either operand data bus 58 or result bus 38.

When the string count is stored in register 602, comparator 606 compares the string count to the state of counter 604. If the number of iterations of the loop exceeds the string count, i.e. the state of counter 604 is greater than the value stored in register 602, then more microcode instructions than required to implement the loop have been dispatched into the instruction processing pipeline. If this condition is detected, comparator 606 notifies other components via cancel bus 502. Comparator 606 also causes next instruction unit 608 to predict the next loop branch instruction as "not taken". Therefore, the MROM unit stops issuing unnecessary microcode instructions.

If the string count exceeds the number of loop iterations, next instruction unit 608 continues to issue microcode instructions. When the number of loop iterations, as measured by counter 604, equals the string count, comparator 606 causes next instruction unit 608 to predict the next branch loop as "not taken". Therefore, MROM unit 34 stops issuing microcode instructions. In this case, MROM unit 34 has issued the right number of microcode instructions, the end of the loop is correctly predicted and no unnecessary microcode instructions have been issued into the instruction processing pipeline.

Figure 7:
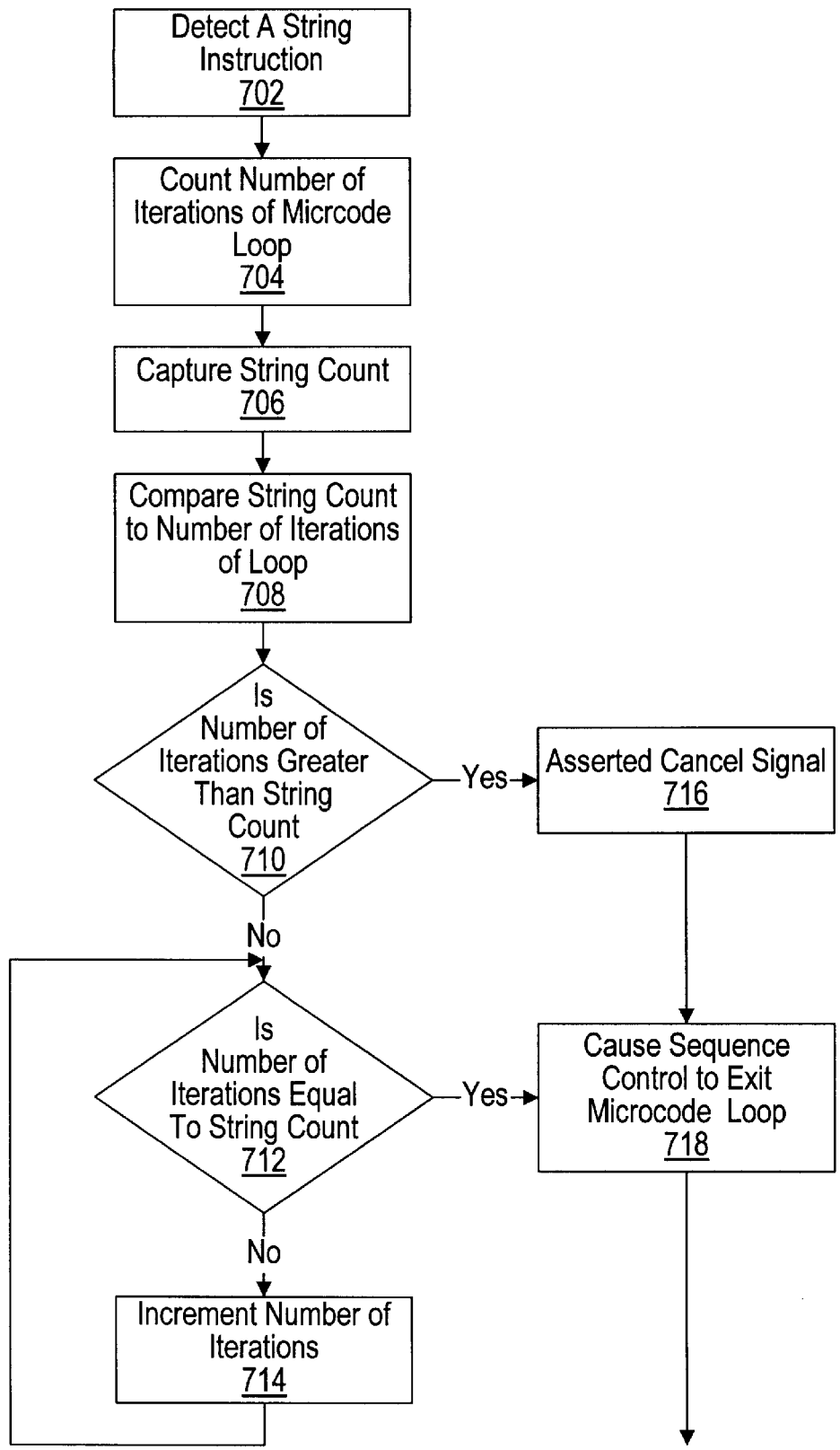
FIG. 7 is a flow chart illustrating the operation of one embodiment of an apparatus to predict the end of a microcode loop.

Referring now to FIG. 7, a flow chart illustrating the operation of one embodiment of an apparatus to predict the end of a microcode loop is shown. In a step 702, a loop of a string instruction is detected. In a step 704, the number of iterations of a microcode loop are counted. In a step 706, the string count is captured. In a step 708, the string count captured in step 706 is compared to the number of iterations of the loop counted in step 704. In a decisional step 710, it is determined whether the number of iterations of the microcode loop is greater than the string count. If the number of iterations of the microcode loop exceeds the string count, then in a step 716 the cancel signal is asserted. In a step 718 the sequence control unit is caused to exit the microcode loop.

If in decisional step 710 the number of iterations does not exceed the string count, then in decisional step 712 it is determined whether the number of iterations equals the string count. If the number of iterations does not equal the string count, then in a step 714 another iteration of microcode instructions is dispatched and the number of loop iterations is incremented. Steps 712 and 714 are repeated until the number of iterations of the loop is equal to the string count. When the number of iterations of the loop equals the string count, then in a step 718 the sequence control unit is caused to exit the string loop.

Figure 8:
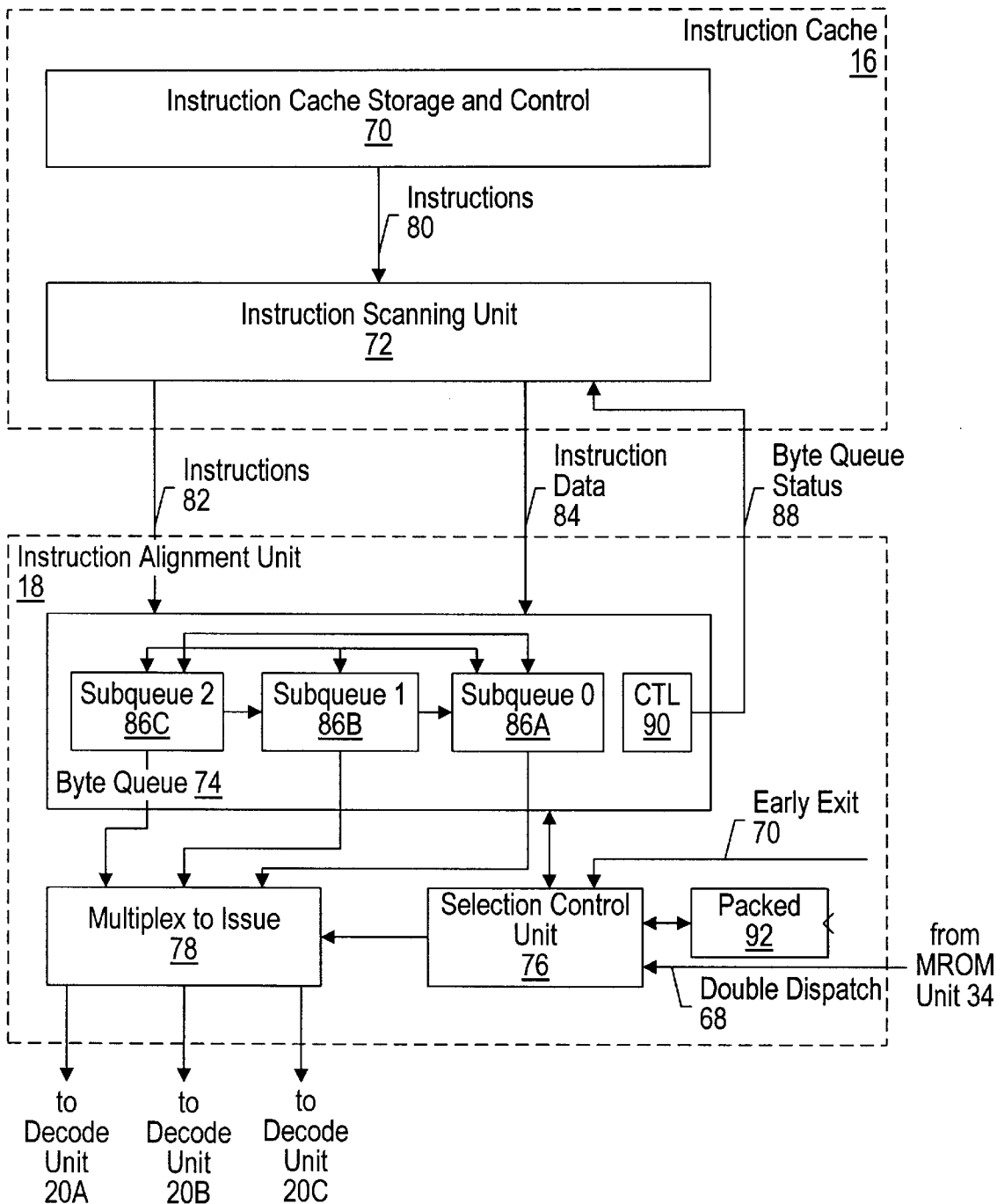
FIG. 8 is a block diagram of one embodiment of an instruction cache and instruction alignment unit shown in FIG. 1.

Turning now to FIG. 8, a block diagram of one embodiment of instruction cache 16 and instruction alignment unit 18 are shown. Instruction cache 16 includes an instruction cache storage and control block 70 and an instruction scanning unit 72. Instruction alignment unit 18 includes a byte queue 74, a selection control unit 76, and a multiplex to issue block 78.

Instruction cache storage and control block 70 includes storage for instruction cache lines and related control circuitry for accessing instructions from the storage, for selecting cache lines to discard when a cache miss is detected, etc. Instruction cache storage and control block 70 receives fetch addresses from branch prediction unit 14 (FIG. 1) in order to fetch instructions for execution by microprocessor 10. Instruction bytes fetched from instruction cache storage and control block 70 are conveyed to instruction scanning unit 72 upon an instructions bus 80. Instruction bytes are conveyed upon instructions bus 80, as well as corresponding predecode data (e.g. start, end, and functional bits). In one embodiment, sixteen bytes stored in contiguous memory locations are conveyed upon instructions bus 80 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 72 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 72 scans the predecode data associated with the bytes which are to be conveyed as instructions to instruction alignment unit 18. In the present embodiment, instruction scanning unit 72 divides the sixteen bytes conveyed by instruction cache storage and control block 70 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 70, according to the present embodiment. As used herein, bytes are contiguous if they are stored in contiguous memory locations in the main memory subsystem. It is noted that particular sizes of various components, such as instruction block sizes, are used herein for clarity of the description. Any size may be used for each component within the spirit and scope of the appended claims.

Instruction scanning unit 72 scans the predecode data of each portion of the instructions independently and in parallel. Instruction scanning unit 72 identifies up to a predefined maximum number of instructions within each portion from the start and end byte information included within the predecode data. For the present embodiment, the predefined maximum number is three. Generally speaking, instruction scanning unit 72 preferably identifies a maximum number of instructions in each portion equal to the number of issue positions included within microprocessor 10.

The instruction bytes and instruction identification information generated by instruction scanning unit 72 are conveyed to byte queue 74 upon an instructions bus 82 and an instruction data bus 84, respectively. The instruction bytes are conveyed as eight byte portions, and the instruction data is arranged accordingly such that each eight byte portion is associated with a portion of the instruction identification information conveyed upon instruction data bus 84. Each eight byte portion and the corresponding instruction identification information forms an instruction block. It is noted that, although an instruction block includes eight bytes in the present embodiment, instruction blocks may include any number of bytes in various embodiments. Byte queue 74 receives the instruction blocks conveyed and stores them into one of multiple subqueues included therein. In the embodiment shown, byte queue 74 includes three subqueues: a first subqueue 86A, a second subqueue 86B, and a third subqueue 86C. First subqueue 86A stores the instruction block which is foremost among the instruction blocks stored in byte queue 74 in program order. Second subqueue 86B stores the instruction block which is second in program order, and third subqueue stores the instruction block which is third in program order. It is noted that various embodiments of byte queue 74 may include any number of subqueues 66.

If a particular portion as scanned by instruction scanning unit 72 includes more than the maximum predefined number of instructions, then the particular portion is retained by instruction scanning unit 72. During the following clock cycle, the particular eight byte portion is scanned again. The predecode data corresponding to the previously identified instructions is invalidated such that instruction scanning unit 72 detects the additional instructions. If the other portion concurrently received with the particular portion is subsequent to the particular portion in program order, then the other portion is rescanned as well. Byte queue 74 discards the instruction blocks received from the other portion, in order to retain program order among the instruction blocks stored in the byte queue.

A control unit 90 within byte queue 74 conveys a byte queue status upon byte queue status bus 88 to instruction scanning unit 72. Byte queue status bus 88 includes a signal corresponding to each subqueue 86. The signal is asserted if the subqueue 86 is storing an instruction block, and deasserted if the subqueue 86 is not storing an instruction block. In this manner, instruction scanning unit 72 may determine how many instruction blocks are accepted by byte queue 74 during a clock cycle. If two instruction blocks are conveyed during a clock cycle and only one instruction block is accepted, instruction scanning unit 72 retains the rejected instruction block and rescans the instruction block in the subsequent clock cycle.

As noted above, an instruction block may contain up to a predefined maximum number of instructions (e.g. three in the present embodiment). Additionally, eight contiguous bytes are conveyed for each instruction block in the present embodiment. However, due to the variable byte length of the x86 instructions, an instruction may begin within one set of contiguous bytes and end in another set of contiguous bytes, referred to as overflow instructions. If an overflow instruction is detected, it is identified as the last of the predefined number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the eight bytes; (ii) a valid mask containing eight bits, one for each of the eight bytes; (iii) a bit indicative of whether the instruction is MROM or fast path; and (iv) an instruction valid bit indicating that the instruction is valid and an overflow bit for the last instruction indicating that it is an overflow. The valid mask includes a binary one bit corresponding to each byte included within the particular instruction (i.e. the bits between the start pointer and end pointer, inclusive, are set). Zero bits are included for the other bytes. Additional information conveyed with the instruction identification information is the taken/not taken prediction if the instruction is a branch instruction bits, indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 70 except for the branch prediction, which is provided by branch prediction unit 14.

Selection control unit 76 examines the instruction identification information stored in each subqueue to generate selection controls for multiplex to issue block 78. Multiplex to issue block 78 includes a plurality of multiplexers for selecting instruction bytes from byte queue 74 for conveyance to each of decode units 20. Byte queue 74 maintains certain properties with respect to each subqueue 86 in order to simplify the selection logic within selection control unit 76, as will be explained in more detail below. Instructions are selected and conveyed, and corresponding instruction identification information is invalidated such that subsequent instructions may be dispatched in subsequent clock cycles.

Subqueues 86 store instruction information in a plurality of instruction positions (or simply "positions"). The number of instruction positions is preferably equal to the maximum number of instructions which may be included in an instruction block. For the present embodiment, three positions are included. The first position ("position I0") stores the instruction identification information corresponding to the instruction which is foremost in program order within the instruction block stored in the subqueue 86. The second position ("position I1") stores the instruction identification information corresponding to the second instruction in program order within the instruction block. Finally, the third position ("position I2") stores the instruction identification information corresponding to the last instruction in program order. Alternatively, position I2 may store instruction identification information corresponding to an overflow instruction. Certain instruction identification information is the same for each instruction (e.g. the segment limit). To avoid duplicating information, this instruction information may be stored as a single copy separate from the instructions positions.

Control unit 90 maintains the information stored in each subqueue 86. In particular, control unit 90 directs each subqueue 86 to shift instruction identification information between the positions when instructions are selected for dispatch. For example, if the instruction corresponding to position I0 is dispatched, the information stored in position I1 is shifted into position I0 and the information stored in position I2 is shifted into position I1. Similarly, if the instructions corresponding to positions I0 and I1 are dispatched, then information stored in position I2 is shifted into position I0. In this manner, the instruction within the subqueue which is foremost in program order is maintained in position I0, the instruction which is second in program order is maintained in position I1, etc. In order to select an instruction for dispatch to decode unit 20A, selection control unit 76 examines the instruction identification information stored in position I0 of each subqueue. Advantageously, a small amount of logic may be employed to select the instruction. Similarly, position I0 of subqueue 86A and position I2 of each subqueue 86A–86C are not examined to select an instruction for decode unit 20B. The second instruction to be dispatched will be found within the first two positions of one of the subqueues 86 when maintained in accordance with the above. Selection control unit 76 informs control unit 90 of which instructions positions were selected for dispatch during a clock cycle, such that subqueue shifting may be performed.

According to one embodiment, instruction identification information is shifted internally to each subqueue 86 independently. Instruction identification information is not, therefore, shifted from position I0 of subqueue 86B into positions within subqueue 86A. Instead, when each of the instructions within subqueue 86A have been dispatched, subqueue 86B is shifted into subqueue 86A as a whole. The logic for shifting between subqueues 86 may operate independently from and in parallel with the internal shifting of each subqueue 86A–86C.

Position I2 may store instruction identification information regarding an overflow instruction. If position I2 is storing information regarding an overflow instruction, then the information is not shifted to position I0 or I1 as described above. In this manner, overflow instruction information is always available in position I2. Selection control unit 76 may examine the information stored in position I2 for routing bytes corresponding to an overflow instruction, as opposed to having to locate the overflow information within the positions and then determining byte routing.

Selection control unit 76 selects instructions from the instruction positions within subqueues 86 for potential dispatch. The instructions selected are the instructions which are foremost in program order among the instructions stored in subqueues 86. The operation of select control unit 76 with respect to double dispatch instructions is discussed next.

More instructions are initially selected for dispatch than the number of issue positions included in microprocessor 10, in order to correctly perform redispatch of instructions when an MROM instruction and a fast path instruction are concurrently dispatched and the MROM instruction is found to be an arbitrary dispatch instruction. Selection control unit 76 then selects from the potentially dispatchable instructions based upon the value of a packed state stored in a packed state register 92 coupled to selection control unit 76 and the state of the double dispatch signal upon double dispatch conductor 68, also coupled to selection control unit 76.

When selection control unit 76 selects an MROM instruction and a fast path instruction for concurrent dispatch during a clock cycle, selection control unit 76 sets the packed state. Otherwise, the packed state is reset. The packed state so generated is stored into packed state register 92 for use during the succeeding clock cycle. Additionally, selection control unit 76 informs control unit 90 that the first of the MROM instruction and the fast path instruction (in program order) is being dispatched. In this manner, byte queue 74 retains the second of the two instructions in program order, despite the dispatch of the second of the two instructions. In one embodiment, the packed state comprises a bit indicative, when set, that an MROM instruction and a fast path instruction were concurrently dispatched in the previous clock cycle.

From the potentially dispatchable instructions, selection control unit 76 selects instructions for dispatch based upon the packed state stored in packed state register 92 and the double dispatch signal. If the packed state is set, an MROM instruction and a fast path instruction were concurrently dispatched in the previous clock cycle. Therefore, the instruction within the potentially dispatchable instructions which is foremost in program order is one of the two instructions previously dispatched when the packed state is set. If the packed state is set and the double dispatch signal is asserted, the concurrent dispatch of the MROM instruction and the fast path instruction is successful. If the packed state is set and the double dispatch signal is deasserted, the concurrent dispatch of the MROM instruction and the fast path instruction is unsuccessful. The MROM instruction occupies at least three issue positions, and therefore the fast path instruction cannot be concurrently dispatched for the embodiment of microprocessor 10 shown in FIG. 1. If the packed state is clear, concurrent dispatch of an MROM and fast path instructions was not performed in the previous clock cycle. Therefore, the instructions within the potentially dispatchable instructions were not previously dispatched.

According to one embodiment, selection control unit 76 selects the foremost instructions in program order from the set of potentially dispatchable instructions if either the packed state is clear or the packed state is set and the double dispatch signal is deasserted. In the case of the packed state being clear, the foremost set of instructions are dispatched and program order is maintained. In the case of the packed state being set and the double dispatch signal being deasserted, the second of the instructions dispatched during the previous clock cycle is redispatched. If the second of the instructions is the MROM instruction, it is dispatched alone. If the second of the instructions is the fast path instruction, additional instructions may be selected for concurrent dispatch. Advantageously, the largest number of concurrently dispatchable instructions is selected, even in the case of redispatching a previously dispatched instruction.

If the packed state is set and the double dispatch signal is asserted, then the instruction within the potentially dispatched instructions which is foremost in program order is the second of the previously dispatched instructions and that instruction is successfully dispatched during the previous clock cycle (i.e. the MROM instruction and fast path instruction, when taken together, occupy a number of issue positions less than or equal to the number of issue positions included within microprocessor 10). This instruction is therefore not selected during the current clock cycle. Instead, instructions are dispatched from the remaining of the potentially dispatchable instructions.

Upon selection of the instructions dispatched, the packed state is determined for the subsequent clock cycle. In addition, control unit 90 is informed of the instructions dispatched. For the case of the packed state being set and the double dispatch signal being asserted, the instruction which was previously dispatched is indicated as dispatched as well as each of the instructions dispatched during the present clock cycle. Subqueues 86 are shifted accordingly. In one embodiment, control unit 90 is informed of the subqueue and position storing the last instruction (in program order) to be dispatched. Selection control unit 76 identifies the last instruction in accordance with the above functionality. Byte queue 74 shifts out the instructions prior to and including the indicated last instruction. In this manner, byte queue 74 operates independent of the logic used to concurrently dispatch MROM and fast path instructions. For example, when packing an MROM instruction and a fast path instruction, the first of the instructions in program order is marked as the last instruction. The second of the instructions is thereby retained in byte queue 74 while the first of the instructions is shifted out.

The operation of selection control unit 76 with respect to the early exit signal from MROM unit 34 is discussed next. Selection control unit 76 receives the early exit signal from sequence control 65 (FIG. 2) via early exit signal line 70. The early exit signal indicates whether the next microcode line issued by MROM access 64 is the last microcode line in a microcode sequence that implements an MROM instruction and the number of microcode instructions in the last microcode line. If the number of microcode instructions is less than the number of issue positions, selection control 76 may pack fastpath instructions after the microcode instructions. For example, in the embodiment illustrated in FIG. 1, three issue positions are available. If the last microcode line of an MROM instruction microcode sequence contains only two microcode instructions, selection control unit 76 may pack one fastpath instruction after the microcode line. Likewise, if the pack signal indicates that the last microcode line contains one microcode instruction, selection control unit 76 may pack two fastpath instructions after the microcode line. By packing fastpath instructions at the end of microcode lines, each issue position is utilized.

Selection control unit 76 packs the fastpath instructions following the microcode instructions. Because the fastpath instructions are later in program order than the MROM instruction, the fastpath instructions are packed subsequent to the microcode instructions. For example, if the last microcode line includes two microcode instructions, the two microcode instructions are dispatched to decode unit 20A and decode unit 20B. The fastpath instruction foremost in program order is dispatched to decode unit 20C. In addition, control unit 90 is informed of the number of fastpath instructions dispatched, and subqueues 86 are shifted accordingly. The packed fastpath instructions are dispatched from byte queue 74 to the proper issue position by multiplex to issue 78.

It is noted that additional details regarding the operation of byte queue 74 may be found in the commonly assigned, co-pending patent application entitled: "A Byte Queue Divided into Multiple Subqueues for Optimizing Instruction Selection Logic", filed concurrently herewith by Narayan, et al. The disclosure of the referenced patent application is incorporated herein by reference in its entirety. It is further noted that additional details regarding the operation of double-dispatch instructions and the sequence control unit may be found in the commonly assigned, co-pending application entitled: "A Method For Concurrently Dispatching Microcode And Directly-Decoded Instructions In A Microprocessor", filed on Jul. 24, 1996 by Narayan et al., Ser. No. 08/685,656. The disclosure of the referenced patent application is incorporated herein by reference in its entirety.

Figure 9:
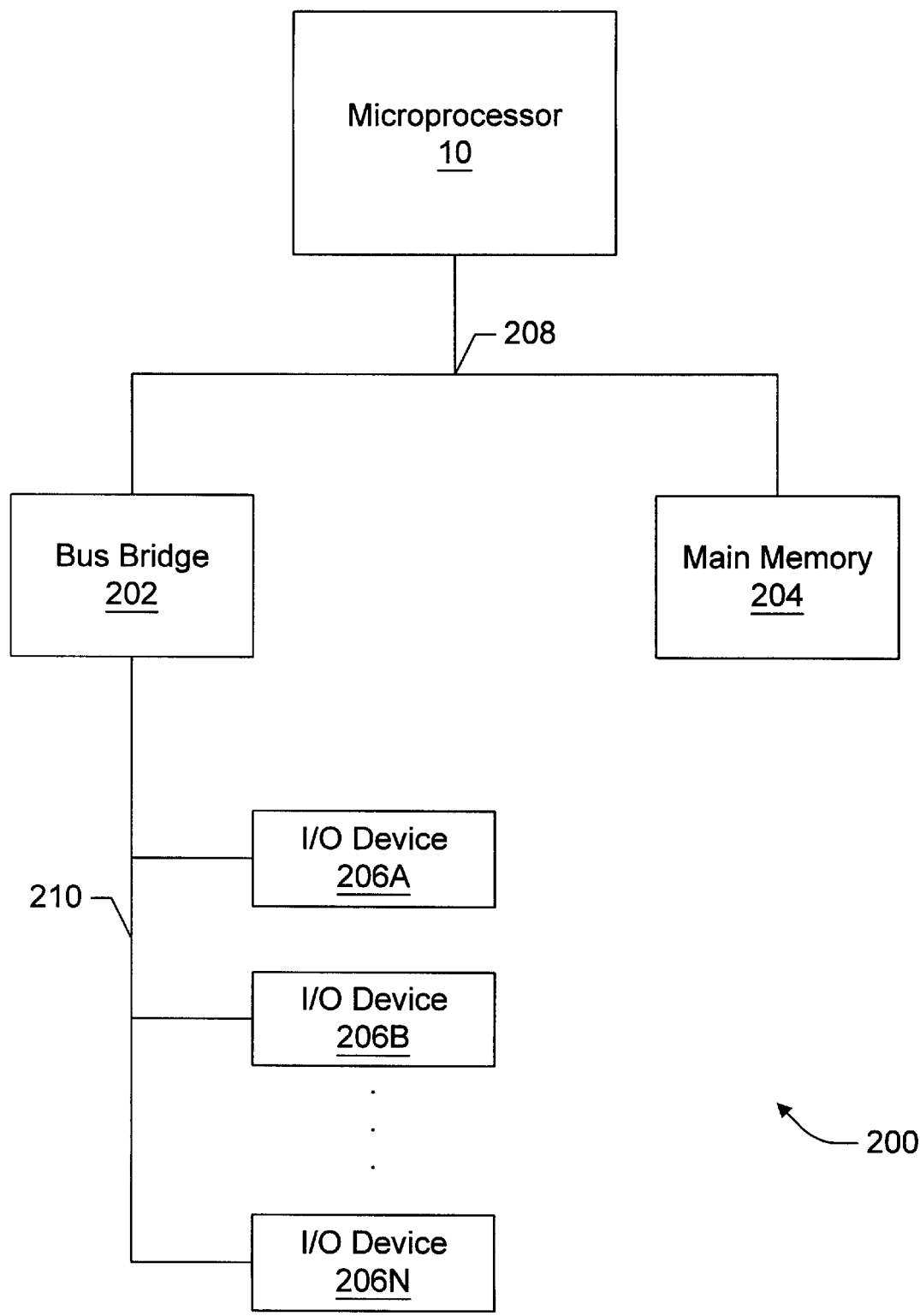
FIG. 9 is a block diagram of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210.

Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture and instruction set have been used as a specific example herein, it is noted that the apparatus and method described herein may be applicable to any microprocessor which employs microcode and directly-decoded instructions. Such embodiments are contemplated.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MRDM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LQDSB | MROM |
| LODSW | MROM |
| LODSD | MROM |

TABLE 1-continued x86 Fast Path, Double Dispatch, and MROM Instructions

| X86 Instruction | Instruction Category |
|---|---|
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fas tpath |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. now abandoned. The disclosure of this patent application is incorporated herein by reference in its entirety.

It is further noted that aspects regarding array circuitry may be found in the commonly assigned U.S. Pat. No. 5,619,469 entitled "High Performance Ram Array Circuit Employing Self-Time Clock Generator for Enabling Array Access", issued Apr. 8, 1997 to Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt, now abandoned; "Superscalar Microprocessor Including a High Performance Instruction Alignment Unit", Ser. No. 08/377,843, filed Jan. 25, 1995 by Witt, et al now abandoned; "A Way Prediction Structure", Ser. No. 08/522,181, filed Aug. 31, 1995 by Roberts, et al now abandoned; "Data Cache which Speculatively Updates a Predicted Data Cache Storage Location with Store Data and Subsequently Corrects Mispredicted Updates", U.S. Pat. No. 5,860,104, issued Jan. 12, 1999 to Witt, et al; "A Parallel and Scalable Instruction Scanning Unit", Ser. No. 08/475,400, filed Jun. 7, 1995 by Narayan now abandoned; and "Apparatus and Method for Aligning Variable-Byte Length Instructions to a Plurality of Issue Positions", U.S. Pat. No. 5,822,559, issued Oct. 13, 1998 to Narayan, et al. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A microprocessor comprising:
a microcode unit coupled to an instruction cache to receive a string instruction specifying a first register storing a string count, wherein said microcode unit is configured to dispatch a microcode routine in response to said string instruction, and wherein said microcode routine includes a first microcode instruction having said first register as an operand, said microcode routine further including one or more additional microcode instructions forming a loop iteration;
an issue position coupled to a decode unit to receive said first microcode instruction from said microcode unit, wherein said issue position is configured to execute said first microcode instruction;

wherein said microcode unit is coupled to said issue position to monitor information transmitted to and transmitted by said issue position to capture said string count, and wherein said microcode unit is configured to dispatch a number of said loop iterations specified by said string count; and wherein said first register is a source operand of said first microcode instruction, and wherein said microcode unit is configured to capture said string count concurrent with said issue position receiving said string count as said source operand of said first microcode instruction.

2. The microprocessor as recited in claim 1 wherein said issue position is coupled to a reorder buffer to receive a reorder buffer tag corresponding to said string count if said string count is not available upon dispatching said first microcode instruction to said issue position, and wherein said microcode unit is configured to capture said reorder buffer tag concurrent with said issue position receiving said tag.

3. The microprocessor as recited in claim 2 wherein said microcode unit is coupled to a plurality of issue positions including said issue position to receive a plurality of results and a plurality of result tags corresponding to said plurality of issue positions, and wherein said microcode unit is configured to monitor said plurality of result tags for said reorder buffer tag and to capture said string count from a corresponding one of said plurality of results upon detecting said reorder buffer tag.

4. The microprocessor as recited in claim 3 further comprising said plurality of issue positions, wherein said first microcode instruction is predetermined to be dispatched to said issue position to which said microcode unit is coupled, and wherein said microcode unit is not coupled to receive source operands and reorder buffer tags corresponding to other ones of said plurality of issue positions.

5. The microprocessor as recited in claim 4 wherein said microcode unit includes a microcode read-only memory (ROM) configured to store said microcode routine, and wherein said microcode ROM is arranged as a plurality of lines, and wherein each of said plurality of lines is configured to store a plurality of microcode instructions equal in number to said plurality of issue positions, and wherein said first microcode instruction is placed within a first line of said plurality of lines which stores said microcode routine in a position which determines that said first microcode instruction is dispatched to said issue position.

6. A microprocessor comprising:

a microcode unit coupled to an instruction cache to receive a string instruction specifying a first register storing a string count, wherein said microcode unit is configured to dispatch a microcode routine in response to said string instruction, and wherein said microcode routine includes a first microcode instruction having said first register as an operand, said microcode routine further including one or more additional microcode instructions forming a loop iteration;

an issue position coupled to a decode unit to receive said first microcode instruction from said microcode unit, wherein said issue position is configured to execute said first microcode instruction;

wherein said microcode unit is coupled to said issue position to monitor information transmitted to and transmitted by said issue position to capture said string count, and wherein said microcode unit is configured to dispatch a number of said loop iterations specified by said string count; and wherein said microcode unit is configured to monitor a result transmitted by said issue position, and wherein a result of executing said first microcode instruction includes said string count, and wherein said microcode unit is configured to capture said string count upon execution of said first microcode instruction.

7. The microprocessor as recited in claim 6 wherein said microcode unit is coupled to a reorder buffer to receive an instruction tag assigned to said first microcode instruction by said reorder buffer, and wherein said microcode unit monitors results transmitted by said issue position for said instruction tag in order to identify said string count being transmitted by said issue position.

8. The microprocessor as recited in claim 7 wherein said issue position is one of a plurality of issue positions, and wherein said first microcode instruction is predetermined to be dispatched to said issue position, and wherein said microcode unit is not coupled to monitor information transmitted to and transmitted by other ones of said plurality of issue positions.

9. The microprocessor as recited in claim 8 wherein said microcode unit includes a microcode read-only memory (ROM) configured to store said microcode routine, and wherein said microcode ROM is arranged as a plurality of lines, and wherein each of said plurality of lines is configured to store a plurality of microcode instructions equal in number to said plurality of issue positions, and wherein said first microcode instruction is placed within a first line of said plurality of lines which stores said microcode routine in a position which determines that said first microcode instruction is dispatched to said issue position.

10. The microprocessor as recited in claim 1 wherein said microcode unit comprises:

a counter for counting a number of dispatches of said loop iteration;

a register for storing said string count; and a comparator coupled to said register and said counter, wherein said comparator is configured to compare said string count to an output of said counter, and wherein said counter is configured to cause said microcode instruction unit to exit a microcode loop when said output of said counter equals said string count.

11. The microprocessor as recited in claim 10 wherein a last instruction of said loop iteration is a conditional branch instruction branching to a first instruction of said loop, and wherein said microcode unit is configured to predict said conditional branch taken until said output of said counter equals said string count.

12. A method for executing a string instruction comprising:

dispatching a first microcode instruction of a microcode routine corresponding to said string instruction, said first microcode instruction having a first register storing a string count as an operand;

repeatedly dispatching one or more additional microcode instructions within said microcode routine, said one or more additional microcode instructions forming a loop iteration;

capturing said string count in a microcode unit responsive to said first microcode instruction;

ending said repeatedly dispatching responsive to having dispatched a number of said loop iterations specified by said string count;

wherein said capturing comprises:

capturing an instruction tag assigned to said first microcode instruction;

detecting said instruction tag transmitted with a result; and capturing said result.

13. The method as recited in claim 12 wherein said dispatching comprises dispatching said instruction to a predefined issue position and said detecting comprises monitoring results transmitted only from said issue position.

14. A method for executing a string instruction comprising:

dispatching a first microcode instruction of a microcode routine corresponding to said string instruction, said first microcode instruction having a first register storing a string count as an operand;

repeatedly dispatching one or more additional microcode instructions within said microcode routine, said one or more additional microcode instructions forming a loop iteration;

capturing said string count in a microcode unit responsive to said first microcode instruction;

ending said repeatedly dispatching responsive to having dispatched a number of said loop iterations specified by said string count;

wherein said capturing comprises:

capturing a source operand of said first microcode instruction if said source operand is available upon dispatch of said first microcode instruction, said source operand comprising said string count;

capturing a source operand tag corresponding to said source operand, if said microcode instruction if said source operand is available upon dispatch of said first microcode instruction;

monitoring results of a plurality of issue positions for said source operand tag; and capturing said source operand in response to said monitoring detecting said tag.

15. A computer system comprising:

a microprocessor including:

a microcode unit coupled to an instruction cache to receive a string instruction specifying a first register storing a string count, wherein said microcode unit is configured to dispatch a microcode routine in response to said string instruction, and wherein said microcode routine includes a first microcode instruction having said first register as an operand, said microcode routine further including one or more additional microcode instructions forming a loop iteration; and an issue position coupled to said microcode unit to receive said first microcode instruction from said microcode unit, wherein said issue position is configured to execute said first microcode instruction;

wherein said microcode unit is coupled to said issue position to monitor information transmitted to and transmitted by said issue position to capture said string count, and wherein said microcode unit is configured to dispatch a number of said loop iterations specified by said string count;

wherein said microcode unit is configured to monitor a result transmitted by said issue position, and wherein a result of executing said first microcode instruction includes said string count, and wherein said microcode unit is configured to capture said string count upon execution of said first microcode instruction; and an input/output (I/O) device for providing data communication between said computer system and another computer system to which said I/O device is couplable.

16. The computer system as recited in claim 15 wherein said I/O device comprises a modem.

17. The microprocessor as recited in claim 6 wherein said microcode unit comprises:

a counter for counting a number of dispatches of said loop iteration;

a register for storing said string count; and a comparator coupled to said register and said counter, wherein said comparator is configured to compare said string count to an output of said counter, and wherein said counter is configured to cause said microcode instruction unit to exit a microcode loop when said output of said counter equals said string count.

18. The microprocessor as recited in claim 17 wherein a last instruction of said loop iteration is a conditional branch instruction branching to a first instruction of said loop, and wherein said microcode unit is configured to predict said conditional branch taken until said output of said counter equals said string count.

19. The method as recited in claim 14 wherein said dispatching comprises dispatching said instruction to a predefined issue position and said detecting comprises monitoring results transmitted from said plurality of issue positions.

* * * * *